(12) United States Patent
Gadh

(10) Patent No.: US 11,691,645 B2
(45) Date of Patent: Jul. 4, 2023

(54) METHOD AND SYSTEM FOR CONTROLLING AUTONOMOUS VEHICLES TO AFFECT OCCUPANT VIEW

(71) Applicant: Honda Motor Co., Ltd., Tokyo (JP)

(72) Inventor: Varun Gadh, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 16/824,626

(22) Filed: Mar. 19, 2020

(65) Prior Publication Data

US 2021/0291864 A1    Sep. 23, 2021

(51) Int. Cl.
*B60W 60/00*    (2020.01)
*G05D 1/02*    (2020.01)
(Continued)

(52) U.S. Cl.
CPC ....... *B60W 60/0013* (2020.02); *G05D 1/0088* (2013.01); *G05D 1/0287* (2013.01); *G06Q 10/06375* (2013.01); *G06Q 30/0269* (2013.01); *G06Q 30/0273* (2013.01); *G06Q 50/30* (2013.01); *B60W 2420/42* (2013.01); *B60W 2420/54* (2013.01); *B60W 2520/06* (2013.01); *B60W 2520/10* (2013.01); *B60W 2530/201* (2020.02); *B60W 2540/225* (2020.02); *B60W 2554/4041* (2020.02); *B60W 2554/4042* (2020.02); *B60W 2554/4044* (2020.02); *B60W 2556/45* (2020.02); *G05D 1/0212* (2013.01); *G05D 1/0276* (2013.01)

(58) Field of Classification Search
CPC ............ B60W 60/0013; G05D 1/0088; G05D 1/0287; G06Q 10/06375; G06Q 30/0269
See application file for complete search history.

(56) References Cited

U.S. PATENT DOCUMENTS 8,660,894 B2    2/2014   O'Sullivan et al.
9,550,528 B1    1/2017   Hakeem et al.
(Continued)

FOREIGN PATENT DOCUMENTS

WO    2019222651 A1    11/2019

OTHER PUBLICATIONS

Lin, Dianchao and Jabari, Saif. "Pay to change lanes: A cooperative lane-changing strategy for connected/automated driving," Preprint submitted to Elsevier, Mar. 13, 2019.
(Continued)

*Primary Examiner* — Peter D Nolan
*Assistant Examiner* — Mikko Okechukwu Obioha
(74) *Attorney, Agent, or Firm* — Plumsea Law Group, LLC

(57) ABSTRACT

A system and method for controlling an autonomous vehicle to affect a view seen by an occupant of the autonomous vehicle is described. In one embodiment, a method for controlling an autonomous vehicle to affect a view seen by an occupant of the autonomous vehicle includes determining a navigation route, determining content associated with the navigation route, monitoring current conditions of the autonomous vehicle and the occupant, determining, based on the current conditions, whether to change a position of the vehicle to affect the view seen by the occupant, and when the current conditions permit, moving the autonomous vehicle to affect the view seen by the occupant.

20 Claims, 11 Drawing Sheets

(51) Int. Cl.
*G06Q 10/0637* (2023.01)
*G06Q 30/0273* (2023.01)
*G06Q 50/30* (2012.01)
*G06Q 30/0251* (2023.01)
*G05D 1/00* (2006.01)

(56) References Cited

U.S. PATENT DOCUMENTS

| | | | |
|---|---|---|---|
| 10,466,701 B2 | 11/2019 | Hashimoto et al. | |
| 11,004,111 B2 * | 5/2021 | Polehn | G06Q 30/0251 |
| 2015/0348112 A1 * | 12/2015 | Ramanujam | G06Q 30/0266 |
| | | | 705/14.63 |
| 2016/0110759 A1 * | 4/2016 | Polehn | G06Q 30/0251 |
| | | | 705/14.49 |
| 2018/0114251 A1 * | 4/2018 | Zavesky | G06V 20/54 |
| 2018/0216958 A1 | 8/2018 | Park | |
| 2018/0245929 A1 | 8/2018 | Watanabe et al. | |
| 2019/0108548 A1 | 4/2019 | Gaither | |
| 2019/0220898 A1 | 7/2019 | Rhodes et al. | |
| 2019/0266643 A1 | 8/2019 | Cho et al. | |
| 2020/0056901 A1 * | 2/2020 | Engle | B60W 60/0013 |
| 2020/0109954 A1 * | 4/2020 | Li | G05D 1/0278 |
| 2021/0048825 A1 * | 2/2021 | Elvitigala | G01C 21/3453 |
| 2021/0150896 A1 * | 5/2021 | Rakshit | G08G 1/0145 |

OTHER PUBLICATIONS

Lin, Dianchao and Jabari, Saif. "Pay to change lanes: A cooperative lane-changing strategy for connected/automated driving," Preprint submitted to Elsevier, Jun. 18, 2019.

* cited by examiner

METHOD AND SYSTEM FOR CONTROLLING AUTONOMOUS VEHICLES TO AFFECT OCCUPANT VIEW

BACKGROUND

The embodiments relate generally to autonomous vehicles, and in particular, to methods and systems for controlling autonomous vehicles to affect occupant view.

Autonomous vehicles offer many advantages including safer travel, reduced traffic congestion, increased lane capacity, lower fuel costs, and minimized travel times. Additionally, occupants of autonomous vehicles, liberated from the demands of driving, may enjoy more free time while traveling in the vehicles. This freedom provides new opportunities to attract the attention of occupants.

SUMMARY

Embodiments provide methods and systems for controlling autonomous vehicles to affect the view seen by an occupant of an autonomous vehicle.

In one aspect, a method for controlling an autonomous vehicle to affect a view seen by an occupant of the autonomous vehicle, may include determining a navigation route, determining content associated with the navigation route, monitoring current conditions of the autonomous vehicle and the occupant, determining, based on the current conditions, whether to change a position of the vehicle to affect the view seen by the occupant, and when the current conditions permit, moving the autonomous vehicle to affect the view seen by the occupant.

Another aspect provides a method for controlling multiple autonomous vehicles to affect a view seen by an occupant of a first autonomous vehicle. The method may include determining a navigation route of the first autonomous vehicle, determining content associated with the navigation route, and monitoring current conditions of the first autonomous vehicle. The current conditions may include information about a second autonomous vehicle impacting the view seen by the occupant of the first autonomous vehicle. The method may further include determining, based on the current conditions, whether to change a position of at least one of the first autonomous vehicle or the second autonomous vehicle to affect the view seen by the occupant of the first autonomous vehicle, and when the current conditions permit, moving at least one of the first autonomous vehicle or the second autonomous vehicle to affect the view seen by the occupant by the first autonomous vehicle.

Another aspect provides a system for autonomous vehicle control to affect occupant view. The system may include an autonomous vehicle, which may include an electronic control unit, a wireless communication device in communication with an autonomous vehicle service provider through a wireless network, and a vehicle sensor. The electronic control unit may control travel of the autonomous vehicle along a navigation route. The electronic control unit may receive from the autonomous vehicle service provider information associating content with the navigation route. The electronic control unit may also receive from the vehicle sensor information concerning the current conditions of the autonomous vehicle as the autonomous vehicle travels on the navigation route. Based on the current conditions, the electronic control unit may determine whether to change a position of the autonomous vehicle to affect a view seen by an occupant of the autonomous vehicle. When the current conditions permit, the electronic control unit may move the autonomous vehicle to affect the view seen by the occupant.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Embodiments provide methods and systems for controlling an autonomous vehicle to affect the view seen by an occupant of the autonomous vehicle. In embodiments, the autonomous vehicle control methods and systems may identify a desired view along a navigation route of the autonomous vehicle and position the autonomous vehicle at a location within the route at which the autonomous vehicle occupant can better see the view. In one implementation, the desired view may be an advertisement, such as a billboard, and the autonomous vehicle control methods and systems may move the autonomous vehicle from a first lane of a road to a second lane of the road that provides the autonomous vehicle occupant with a better view of the advertisement due to, for example, a closer distance or a more favorable viewing angle for the advertisement.

Figure 1:
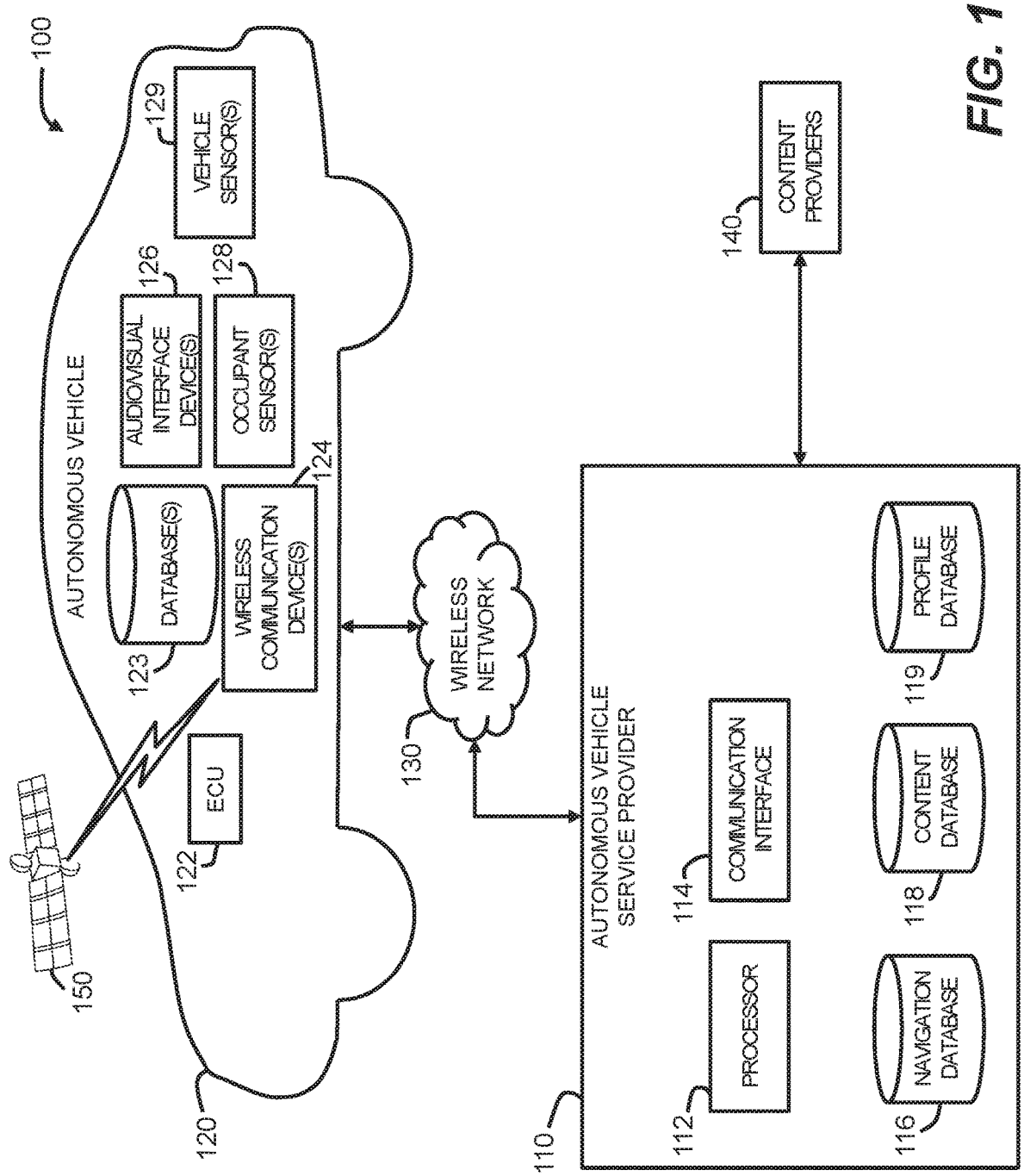
FIG. 1 is a schematic diagram that illustrates a system for controlling an autonomous vehicle to affect the view seen by an occupant of the autonomous vehicle, according to an embodiment.

FIG. 1 illustrates an embodiment of a system 100 for controlling an autonomous vehicle. As shown, system 100 may include an autonomous vehicle service provider 110 and an autonomous vehicle 120. Autonomous vehicle service provider 110 may include hardware, software, and components that are configured to communicate with a plurality of autonomous vehicles, including autonomous vehicle 120.

In this embodiment, autonomous vehicle service provider 110 may include a processor 112 that is in communication with a communication interface 114, a navigation database 116, a content database 118, and a profile database 119. In some embodiments, autonomous vehicle service provider 110 may include other components not shown in FIG. 1 to facilitate receiving information from autonomous vehicles, determining navigation routes and optimal locations for viewing content, and facilitating the movement of autonomous vehicles to the optimal locations according to the example embodiments described herein.

In embodiments, processor 112 may include a computer system. As used herein, the term "computer system" refers to the computing resources of a single computer, a portion of the computing resources of a single computer, and/or two or more computers in communication with one another, any of which resources may also be operated by one or more human users. In one embodiment, processor 112 may include a server.

In embodiments, communication interface 114 may be configured to allow autonomous vehicle service provider 110 to communicate with one or more autonomous vehicles, including autonomous vehicle 120. For example, in one embodiment, communication interface 114 may be a wireless transceiver that transmits signals (e.g., commands, messages, and/or information) to one or more autonomous vehicles and also receives signals from one or more autonomous vehicles. As shown, communication interface 114 may communicate with autonomous vehicle 120 through a wireless network 130. Wireless network 130 may be, for example, a cellular network.

Autonomous vehicle service provider 110 may include various provisions for storing information. In embodiments in which an autonomous vehicle service provider 110 may be used to calculate routes for a navigation system, the service provider 110 may include one or more databases for storing information. In some embodiments, a service provider can include one or more databases for navigation information. In addition, in some embodiments, a service provider can include one or more databases for storing traffic information. In other embodiments, where routes may be calculated onboard of an autonomous vehicle by an electronic control unit or another system, the autonomous vehicle can include one or more databases that store traffic information. It will be understood that various different databases could also provide other types of information including, but not limited to: weather information, carpool lane information, energy consumption information, as well as any other kind of information.

In embodiments, autonomous vehicle service provider 110 may be provisioned with a navigation database 116, which may store information for determining navigation routes and for moving autonomous vehicles within a route and within geographic features. Such information may include, for example, maps, traffic, route identifiers, distance information, roads, road features (e.g., numbers and layouts of lanes), bridges, tunnels, buildings, topography, and other information for determining routes and positions of autonomous vehicles. As used herein, the term "traffic information" refers to any information related to the speed of one or more vehicles on a roadway. Traffic information can include the current speeds of one or more vehicles. In some cases, the average speed of vehicles on a roadway may be stored as traffic information. Traffic information may refer to either real-time traffic information or historic traffic information.

In embodiments, content database 118 may store information regarding content to be viewed by occupants of autonomous vehicles along travel routes. Such information may include, for example, the type of content (e.g., a sign, a billboard, a building, an art installation, and a landscape feature), and the physical location of the content (e.g., distance and position from a road, and directions from which content may be viewed). Content database 118 may also associate the information with content providers 140, such as a company advertising a product and/or service on a billboard.

In embodiments, profile database 119 may store information regarding persons and organizations participating in embodiments of systems and methods for controlling autonomous vehicles. Such information may include, for example, characteristics and conditions of autonomous vehicle occupants, autonomous vehicle owners, and content providers. Profile database 119 may also store preferences for each participant, such as demographic information for persons and advertising impression preferences for organizations. Profile database 119 may also store information related to compensation agreements between content providers 140 and an autonomous vehicle service provider 110, for example, designating an amount of money a content provider 140 pays autonomous vehicle service provider 110 for each occupant view of content of the content provider 140.

As used herein, the term "database" may include any kind of storage device, including but not limited to: magnetic, optical, magneto-optical, and/or memory, including volatile memory and non-volatile memory. In embodiments, navigation database 116, content database 118, and profile database 119 may be integral with processor 112. In other embodiments, databases 116, 118, and 119 may be separate from processor 112. Two or more of databases 116, 118, and 119 may also be combined.

Although FIG. 1 illustrates one autonomous vehicle for the purpose of explanation, it should be understood that autonomous vehicle service provider 110 may be configured to communicate with and/or control any number of autonomous vehicles. For example, in some embodiments, autonomous vehicle service provider 110 may be configured to communicate with a fleet of autonomous vehicles, which can be located in the same or different geographic locations. In this manner, autonomous vehicle service provider 110 may be able to communicate with and/or control autonomous vehicles that are located across a large geographic area.

As shown in FIG. 1, system 100 may include one or more content providers 140, which may be in communication with autonomous vehicle service provider 110. In embodiments, content providers 140 may provide information to populate content database 118 and profile database 119.

In embodiments, an autonomous vehicle may include provisions for receiving, processing, and transmitting information for assessing conditions of the vehicle and the vehicle's surroundings, for determining conditions and characteristics of an occupant, and for controlling movement of the vehicle. For example, as shown in FIG. 1, an autonomous vehicle 120 may include an electronic control unit 122, one or more databases 123, one or more wireless communication devices 124, one or more audio/visual interface devices 126, one or more occupant sensors 128, and one or more vehicle sensors 129.

In embodiments, electronic control unit 122, referred to herein as "ECU," may be a microprocessor, and may be configured to communicate with, and/or control, various components of autonomous vehicle 120. In addition, in some embodiments, electronic control unit 120 may be configured to control additional components of an autonomous vehicle that are not shown. In one embodiment, electronic control unit 120 may be configured to communicate with, and/or control, databases 123, wireless communication devices 124, audio/visual interface devices 126, occupant sensors 128, and vehicle sensors 129, as well as other components or systems.

In embodiments, electronic control unit 122 may communicate through wireless communication devices 124 with devices and networks external to autonomous vehicle 120. Wireless communication devices 124 may use wireless communication technology such as WiFi cellular, Bluetooth, Global Positioning System (GPS), and Vehicle-to-Vehicle (V2V).

In some embodiments, electronic control unit 122 may communicate using a GPS receiver of wireless communication devices 124, and may be configured to receive GPS information from a global positioning system 150.

Additionally, electronic control unit 122 may communicate with, and/or control, audio/visual interface devices 126. In particular, electronic control unit 122 may be configured to transmit information to audio/visual interface devices 126, as well as to receive information from devices 126, to communicate with users of system 100, such as occupants of autonomous vehicle 120.

In embodiments, audio/visual interface devices 126 may include any device for receiving information from, and providing information to, a user of system 100. In implementations, for example, an audio/visual interface device 126 may be a device with audio and video outputs and inputs, such as a touchscreen with speakers and a microphone. A single audio/visual device may be provided to be used by all occupants of autonomous vehicle 120. Alternatively, several audio/visual devices may be provided, with each one assigned to and used by a different occupant of autonomous vehicle 120.

Audio/visual interface devices 126 may also include devices to call the attention of occupants of autonomous vehicle 120, such as lights, speakers, and haptic devices, which may be positioned at locations within vehicle 120 to draw an occupant's attention to a particular location or direction. For example, in one embodiment, lights around a window of autonomous vehicle 120 may be illuminated to prompt an occupant to look through the window.

In embodiments, audio/visual interface devices 126 may also include a personal device of an occupant, such as a smartphone. Autonomous vehicle 126 may communicate with a personal device through wireless communication devices 124. In implementations, autonomous vehicle service provider 112 may provide the occupant with a software application installed on the personal device to facilitate interactions with the autonomous vehicle 120 and/or autonomous vehicle service provider 110.

Embodiments may include provisions for detecting and monitoring conditions of occupants of autonomous vehicle 120, for example, using occupant sensors 128. Such conditions may include, for example, the position of the occupant inside the autonomous vehicle 120 and the current activity of an occupant (e.g., sleeping, talking to another occupant, talking on a cellular phone, using a mobile computing device, and looking out a window of autonomous vehicle 120). Occupant sensors 128 may include, for example, cameras, microphones, eye gaze detection devices, pressure sensors, heat sensors, wireless communication sensors, accelerometers, gyroscopes, physiological sensors (e.g., heart rate monitors), temperature sensors, and biometric sensors. Occupant sensors 128 may also include the monitoring of an occupant's activities on the occupant's mobile computing/communication device, for example, through a software application on the device, which monitors how the occupant is using the device. Occupant sensors 128 may be provided on the autonomous vehicle 120 or on devices used and/or worn by an occupant (e.g., a wearable device, such as a Fitbit™ or Apple Watch™).

Embodiments may include provisions for detecting and monitoring the surroundings of autonomous vehicle 120, for example, using vehicle sensors 129. Such surroundings may include, for example, lane markings, road features, traffic lights, guard rails and other fixed objects, and surrounding vehicles. Vehicle sensors 129 may include, for example, one or more of a camera, a LIDAR sensor, or a global positioning system (GPS) sensor. Vehicle sensors 129 may provide information to electronic control unit 122, which may be configured to use the information to operate the autonomous vehicle 120 using an autonomous driving system.

In embodiments, electronic control unit 122 may also provide an autonomous vehicle control and navigation system, which may be associated with autonomous vehicle service provider 110. As used herein, the term "service provider" refers to any collection of computing resources and/or databases that are disposed outside of autonomous vehicle 120 and which are capable of providing resources to autonomous vehicle 120. In some cases, autonomous vehicle service provider 110 may be a collection of networked computers or computer servers. Autonomous vehicle service provider 110 may be used to receive, process, and/or store information of any kind. In one embodiment, autonomous vehicle service provider 110 may be configured to collect information related to vehicle navigation and content providers along routes, process the information, and store the information for later use. In addition, autonomous vehicle service provider 110 may be configured to calculate routes for autonomous vehicle 120.

As shown in FIG. 1, an autonomous vehicle 120 may include provisions for communicating with an autonomous vehicle service provider 110. In embodiments, autonomous vehicle 120 may communicate with autonomous vehicle service provider 110 using wireless network 130. Generally, wireless network 130 may be any type of network. In some cases, wireless network 130 may be a vehicle communication network that uses vehicles for at least some nodes of the network. In addition, a vehicle communication network may include roadside units as nodes. Vehicle communication networks may be used for exchanging various types of information between vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m. In other embodiments, autonomous vehicle service provider 110 may be configured to communicate with autonomous vehicle service provider 110 using any other type of wireless network, including, but not limited to WiFi networks, cell phone networks, as well as any other type of network. Furthermore, wireless network 130 may be associated with any type of network standard including, but not limited to CDMA, TDMA, GSM, AMPS, PCS, analog and/or W-CDMA. In embodiments, wireless communication devices 124 may include a network antenna through which electronic control unit 122 communicates with wireless network 130.

Autonomous vehicle 120 may also include provisions for communicating with one or more components of another vehicle. For example, electronic control unit 122 may communicate through wireless communication devices 124 directly with one or more additional devices of another autonomous vehicle, including various sensors or systems of the other vehicle. In implementations, autonomous vehicle 120 may be configured to communicate using vehicle-to-vehicle (V2V) communication, which provides vehicles with the ability to communicate with each other and wirelessly exchange information about the speed, location, and heading of surrounding vehicles. In embodiments using V2V technology, autonomous vehicle 120 may broadcast and receive omni-directional messages (e.g., up to 10 times per second), creating a 360-degree "awareness" of other vehicles in proximity. Autonomous vehicle 120 may be configured with appropriate software and/or applications that can use the messages from surrounding vehicles to determine appropriate movements in response.

As shown in FIG. 1, autonomous vehicle 120 may also include provisions for storing information received from sources internal and external to vehicle 120. In embodiments, autonomous vehicle 120 may include one or more databases 123 in communication with electronic control unit 122. Databases 123 may store information, for example, from devices of autonomous vehicle 122, such as audio/visual interface devices 126 and occupant sensors 128, as well as information from autonomous vehicle service provider 110, including information from navigation database 116, content database 118, and profile database 119.

In embodiments, all or most of the components of autonomous vehicle 122 shown in FIG. 1 may be housed in a single case or unit. In other embodiments, the various components of autonomous vehicle 122 shown in FIG. 1 are not housed in a single physical case, but instead, are distributed throughout autonomous vehicle 120 and communicate with one another via known wired or wireless methods. For example, in a system where one or more items communicate wirelessly, the Bluetooth™ protocol may be used.

Figure 2:
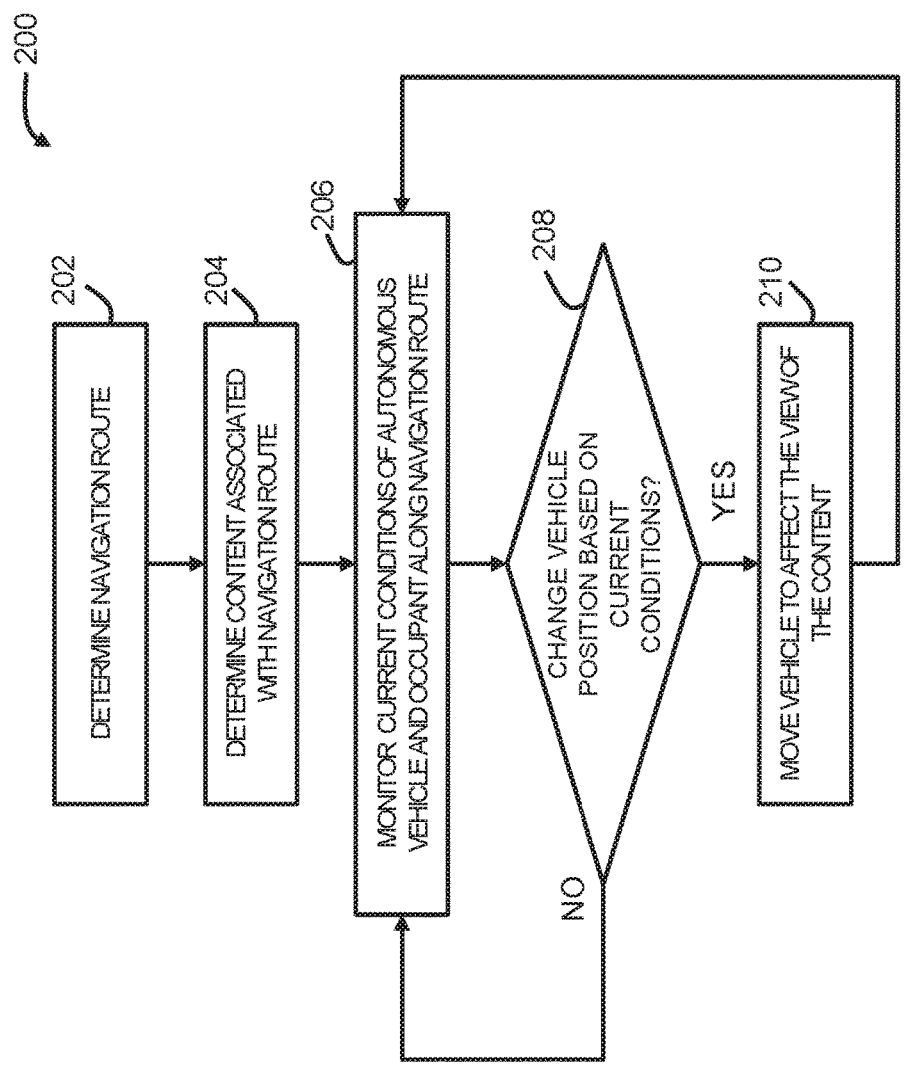
FIG. 2 is a flowchart of a method for controlling an autonomous vehicle to affect the view seen by an occupant of the autonomous vehicle, according to an embodiment.

Referring now to FIGS. 1 and 2, an example embodiment provides a method 200 for controlling an autonomous vehicle to affect occupant view. As shown in the flowchart of FIG. 2, method 200 may begin in step 202 by determining a navigation route of an autonomous vehicle. The navigation route may be determined by the autonomous vehicle service provider 110 and communicated to the autonomous vehicle 120, or may be determined by the autonomous vehicle 120 itself.

Once a navigation route is determined, method 200 may continue in step 204 by determining content associated with the navigation route. Content may be associated with a navigation route based on its location, its proximity to the route, and/or whether it is viewable by occupants of vehicle traveling along the route. For example, referring to FIG. 1, data of navigation database 116 may be cross-referenced with data of content database 118 to establish the location of content along a route. In one implementation, content may be a particular billboard adjacent to a multi-lane highway. The associated content may be determined by the autonomous vehicle service provider 110 and communicated to the autonomous vehicle 120, or may be determined by the autonomous vehicle 120 itself. In embodiments, the associated content may be determined when the navigation route is determined, and before a trip begins. Alternatively, associated content may be determined dynamically as an autonomous vehicle 122 travels along the determined navigation route.

Having determined the navigation route and associated content, method 200 may continue in step 206 by monitoring current conditions of the autonomous vehicle 120 and occupant as the autonomous vehicle 120 travels along the navigation route. Those conditions may include any information necessary to decide whether to change the movement of the vehicle to affect the occupant's view. For the autonomous vehicle 120, such conditions may include speed, direction, the lane in which the vehicle is traveling, the position of the content relative to the vehicle 120, and those same types of information for surrounding vehicles. For the occupant, such conditions may include the current activity of the occupant, such as whether the occupant is looking up or is otherwise occupied.

After compiling the necessary information on the conditions, method 200 may continue in step 208 by deciding whether the position of the autonomous vehicle 120 should be changed based on the current conditions. That decision may incorporate considerations such as: whether the occupant is available to view the content; whether the content is appropriate for the occupant; whether changing the position of the autonomous vehicle 120 will affect the occupant's view of the content; whether changing the position of the vehicle can be physically accomplished given the surrounding vehicles and road conditions; whether changing the position of the vehicle will undesirably impact the speed of the vehicle, the route travel time, and/or route distance; and whether the autonomous vehicle service provider will receive compensation for a view of the content by the occupant.

If in step 208, the current conditions do not justify changing the position of the autonomous vehicle 120, then the vehicle 120 is allowed to continue on the navigation route without changing its position, and the method 200 returns to step 206, further monitoring the autonomous vehicle 120.

However, if in step 208, the current conditions do support changing the position of the autonomous vehicle 120, the method 200 continues in 210 by moving the autonomous vehicle 120 to affect the view of the occupant. In one example, step 208 may decide, based on the current lane in which the autonomous vehicle 120 is traveling relative to the position of a billboard (the associated content), that moving the autonomous vehicle 120 to another lane closer to the billboard will improve the occupant's view of the billboard, and accordingly in step 210, the autonomous vehicle 120 is moved to that closer lane.

Figure 3:
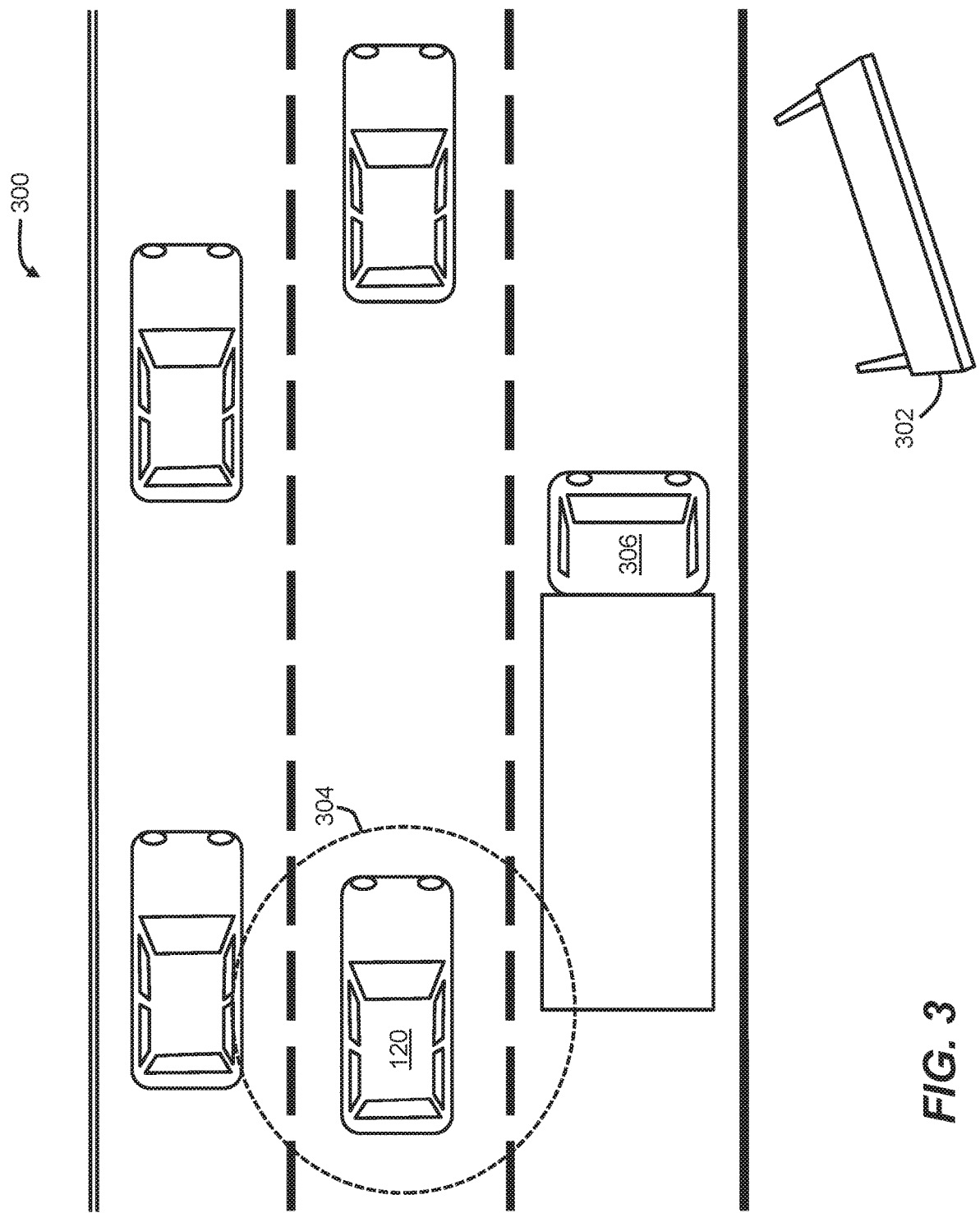
FIGS. 3-5 are schematic diagrams that illustrate a first implementation of a method and system for controlling an autonomous vehicle to affect the view seen by an occupant of the autonomous vehicle, according to an embodiment.
Figure 4:
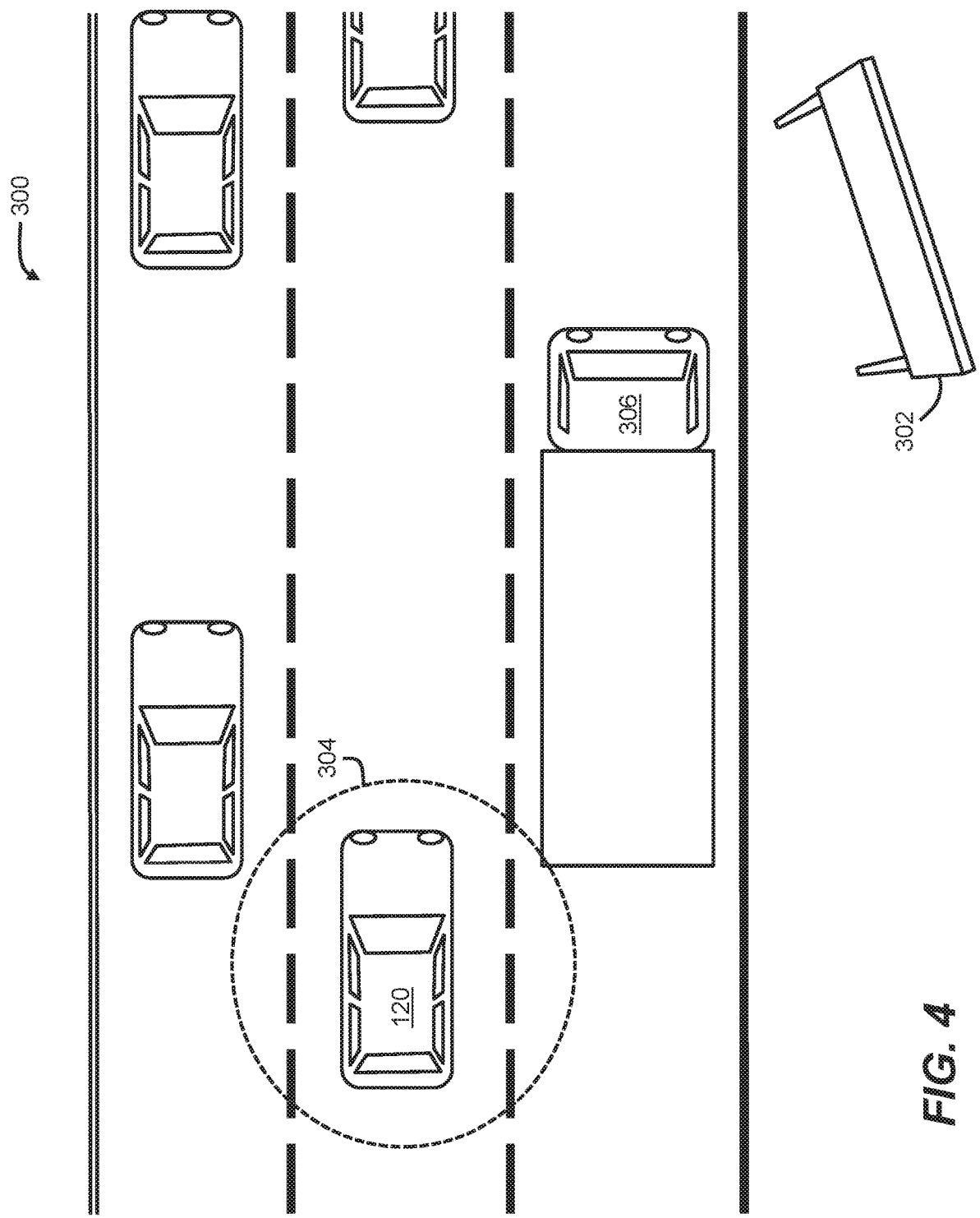
Figure 5:
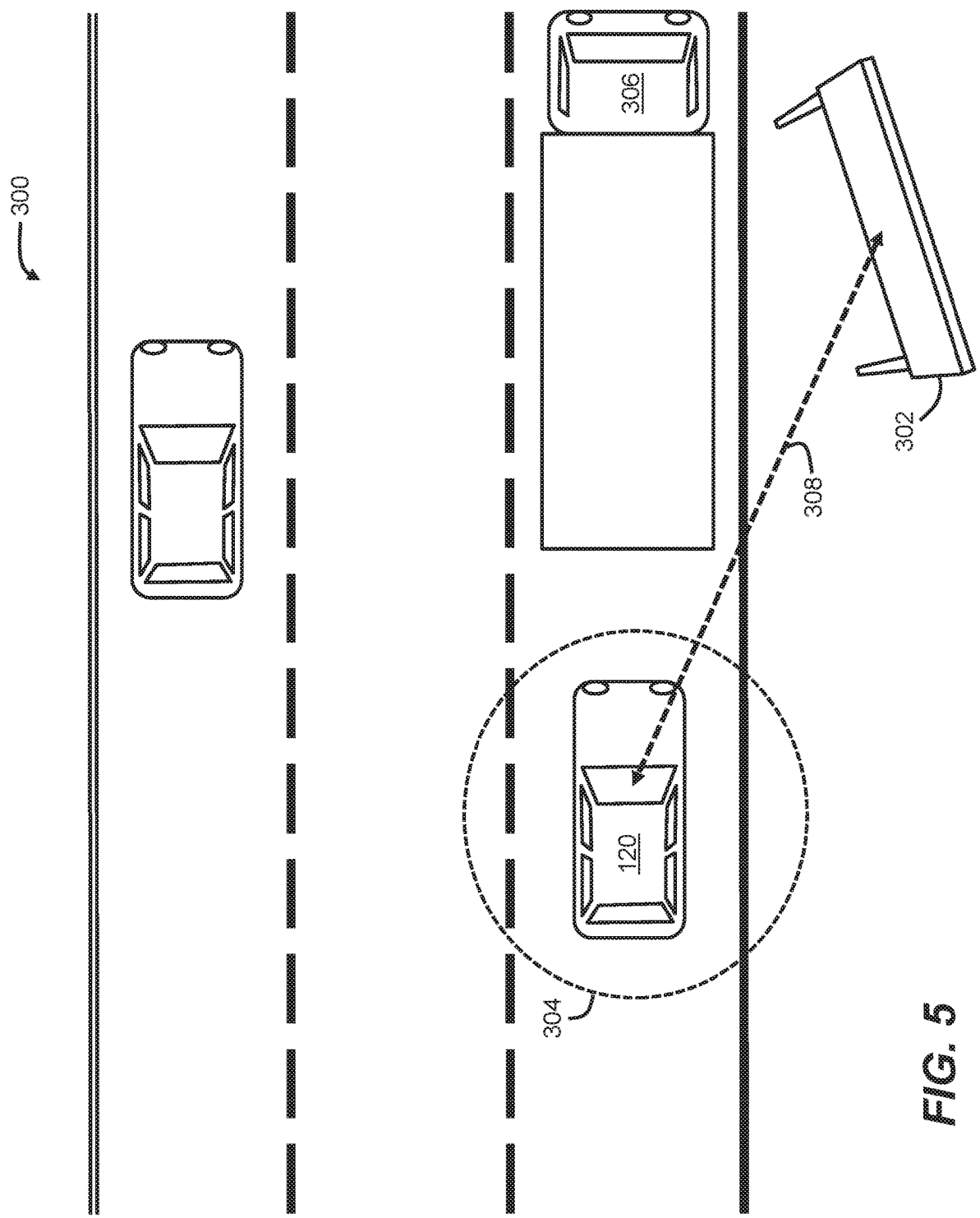

FIGS. 3-5 illustrate an exemplary implementation of method 200, according to an embodiment. As show in FIG. 3, an autonomous vehicle 120 may be traveling along a center lane of a three lane highway 300, with other vehicles surrounding autonomous vehicle 120. At this point, the navigation route may have already been determined according to step 202 of FIG. 2, and the autonomous vehicle 120 may be following that navigation route.

Using location determining devices, such as GPS devices, the autonomous vehicle 120 may then determine that it is approaching content 302 associated with the navigation route. Corresponding to step 204 of FIG. 2, the associated content may be determined dynamically as the autonomous vehicle 120 is traveling or may be predetermined along with the navigation route.

As the autonomous vehicle 120 is traveling along the navigation route on highway 300, the autonomous vehicle 120 may also be monitoring the current conditions of the autonomous vehicle 120 and the occupant of the vehicle 120, corresponding to step 206 of FIG. 2. For example, in FIG. 3, as represented by the dashed circle 304, the autonomous vehicle 120 may be monitoring the relative speeds, positions, headings, and sizes of the surrounding vehicles, by using vehicle sensors 129 or by receiving the information through wireless communications, such as V2V communications. The autonomous vehicle 120 may also be monitoring the current activity of the occupant, for example, using occupant sensors 128 or by monitoring the occupant's use of a cellular telephone or mobile computing device.

In this example, the electronic control unit 122 of the autonomous vehicle 120 may determine that the occupant is not preoccupied and is available to view the content 302 approaching along the navigation route. The electronic control unit 122 may also determine, based on information from the content database 118 and/or the profile database 119, that the content 302 is appropriate for the particular occupant. For example, the destination of the occupant's navigation route may be a beach area and the content 302 may be a billboard advertising a hotel at the beach area destination. As another example, based on the time of day, a billboard advertising a restaurant may be deemed appropriate for an occupant traveling during traditional times for meals, such as breakfast time, lunch time, or dinner time. As another example, the content 302 may be considered appropriate for the particular occupant if a view of the content 302 by the occupant would result in a payment to autonomous vehicle service provider 110 by a content provider 140, based on an advertising agreement between those parties.

Referring to FIG. 3, the electronic control unit 122 may also determine that a second vehicle 306 is traveling at a similar speed in an adjacent lane to the right of the center lane in which the autonomous vehicle 120 is traveling, and that the second vehicle 306 is large (e.g., a tractor trailer). The electronic control unit 122 may further determine that if the autonomous vehicle 120 continues traveling in the center lane, the occupant's view of content 302 will be obstructed. The electronic control unit 122 may also determine whether changing the location or heading of the autonomous vehicle 120 may be accomplished, given the present circumstances, for example, the road conditions (e.g., dry, wet, icy, or snow-covered), the road structure (e.g., whether the lanes continue or merge), the traffic conditions (e.g., light or heavy traffic), the spacing and relative speeds, positions, and headings of surrounding vehicles, and the effect on the time and distance of the navigation route (e.g., minimal time and/or distance increase).

In this example, based on the current conditions, the electronic control unit 122 may determine that the autonomous vehicle 120 can be moved to affect the view of the occupant (corresponding to "YES" at step 208 of FIG. 2). Accordingly, electronic control unit 122 may change the movement of the autonomous vehicle 120 along the navigation route by changing, for example, the speed, heading, direction, or lane of the vehicle 120. As shown incrementally in FIGS. 4 and 5, in this example, electronic control unit 122 may slow the speed of the autonomous vehicle 120 relative to the large vehicle 306 in the right lane, and then cause the autonomous vehicle 120 to switch lanes from the center lane to the right lane, and behind the large vehicle 306. As represented by the arrow 308 in FIG. 5, this movement may then provide the occupant of the autonomous vehicle 120 with a clear view of the content 302 as the autonomous vehicle passes the content 120 on the highway 300.

In embodiments, after affecting the view of the occupant, the system 100 may record the event as a compensable impression, for which a content provider 140 pays the autonomous vehicle service provider 110. For example, the event may be recorded in the profile database 119 and may be associated with the content provider 140 that sponsored the content 302. The event may be based on the change in position of the autonomous vehicle 120, closer to the content 302. In embodiments, the event may be based on confirmation of the impression by tracking the occupant's perception, for example, using occupant sensors 128 such as cameras or eye gaze devices, or using responses received from the occupant through an audio/visual interface device 126 or personal device (e.g., the occupant pressing a button indicating that the content 302 was viewed by the occupant). With the event recorded, the system 100 may facilitate accounting and/or payment for the event (e.g., a few cents for each advertising impression) between the autonomous vehicle service provider 110 and the particular content provider 140.

In embodiments, as the autonomous vehicle 120 is approaching content 302 in FIGS. 3-5, system 100 may include provisions for calling the occupant's attention to the content 302. For example, audio/visual interface devices 126 may provide auditory and visual cues, such as tones, blinking lights, or pop-up windows on graphical user interfaces, to alert an occupant to the upcoming content 302. In one implementation, the autonomous vehicle 120 may be equipped with lights and/or speakers adjacent to each window of the vehicle 120, and may activate only the lights and/or speakers associated with a particular window to signal to the occupant through which window to view the content 302.

In embodiments, system 100 may include provisions for targeting content based on conditions of an occupant. Such conditions may be stored in profile database 119, and may be known by registration of an occupant's mobile computing device with the autonomous vehicle service provider 110, such as through an application installed on the mobile computer device. With identifying information of the occupant, decisions about moving the autonomous vehicle 120 may be made based on whether the content 302 is targeted for the particular occupant. For example, an occupant may be identified as a previous shopper and/or buyer of a particular designer brand, and the content 302 may be for a store of the particular designer. In embodiments, information of an occupant may be gathered and stored by the autonomous vehicle service provider 110, which may track the use of the autonomous vehicles by the occupant, including, for example, routes, destinations, travel times, travel days, activities during travel, where occupant looks during travel, music preferences, podcast preferences, television/video preferences, and entertainment preferences.

In further embodiments, system 100 may include provisions for customizing content for a particular occupant of the autonomous vehicle 120. For example, referring to FIGS. 3-5, content 302 may be an electronic billboard, rather than a static billboard. The electronic billboard may include means for communicating with one or more of the autonomous vehicle service provider 110, the autonomous vehicle 120, or the content providers 140. In embodiments, the electronic billboard may communicate through wireless network 130, or may communicate directly, such as through direct WiFi communication with autonomous vehicle 120. In embodiments, based on characteristics or conditions of a particular occupant of autonomous vehicle 120, system 100 may change the electronic billboard content 302 as the vehicle 120 is being moved for a better view of content 302 in FIGS. 3-5.

Figure 6:
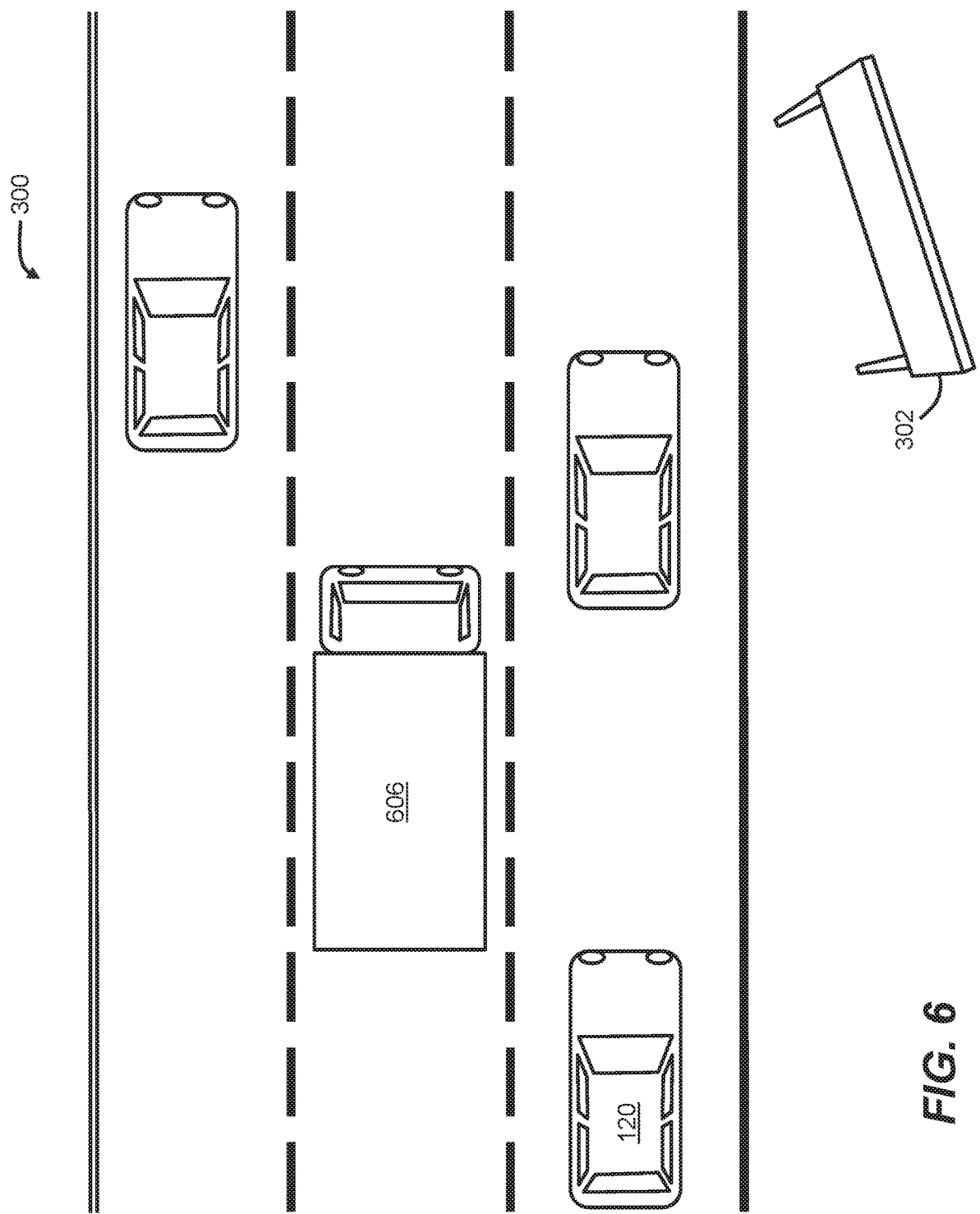
FIGS. 6-8 are schematic diagrams that illustrate a second implementation of a method and system for controlling an autonomous vehicle to affect the view seen by an occupant of the autonomous vehicle, according to an embodiment.
Figure 7:
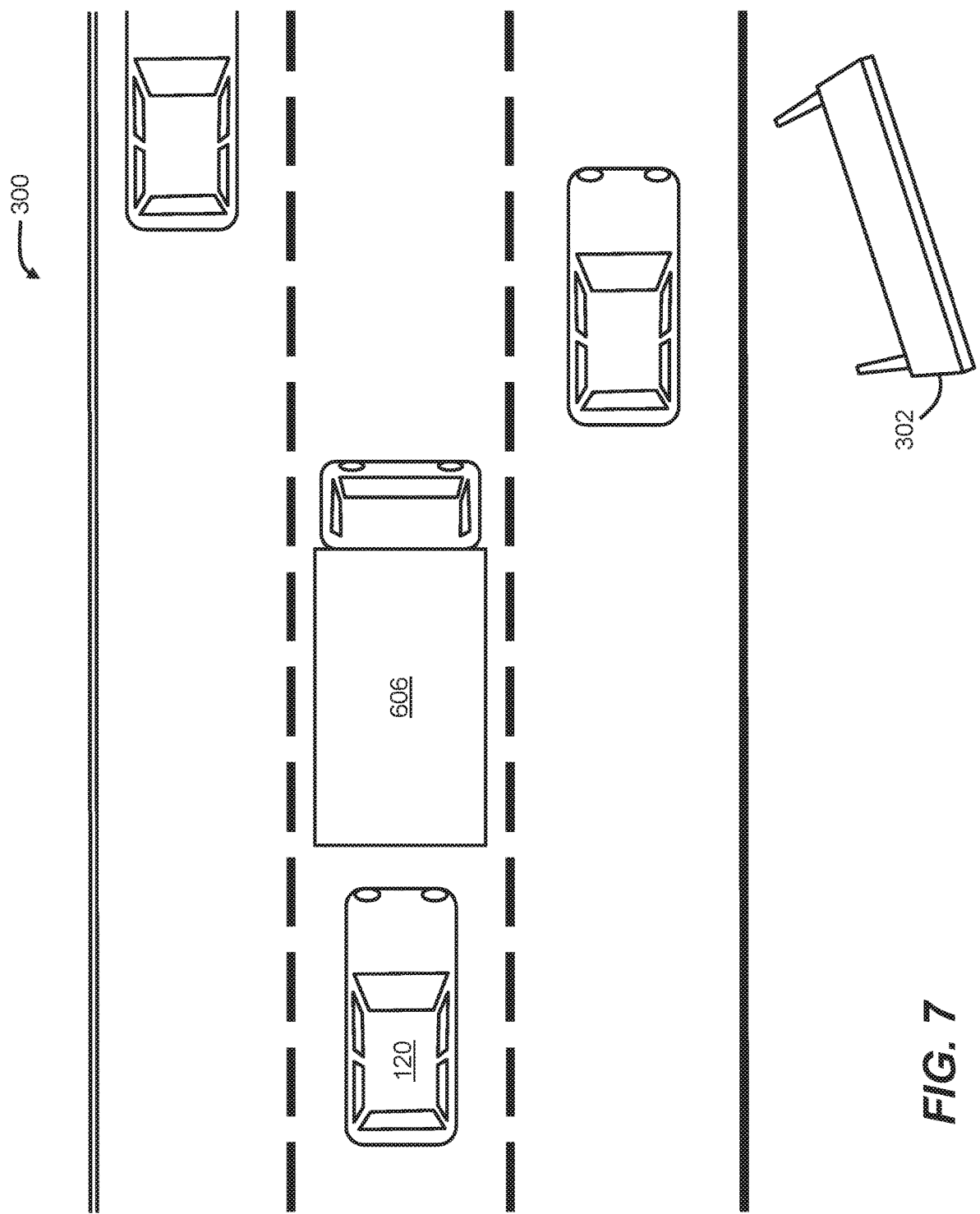
Figure 8:
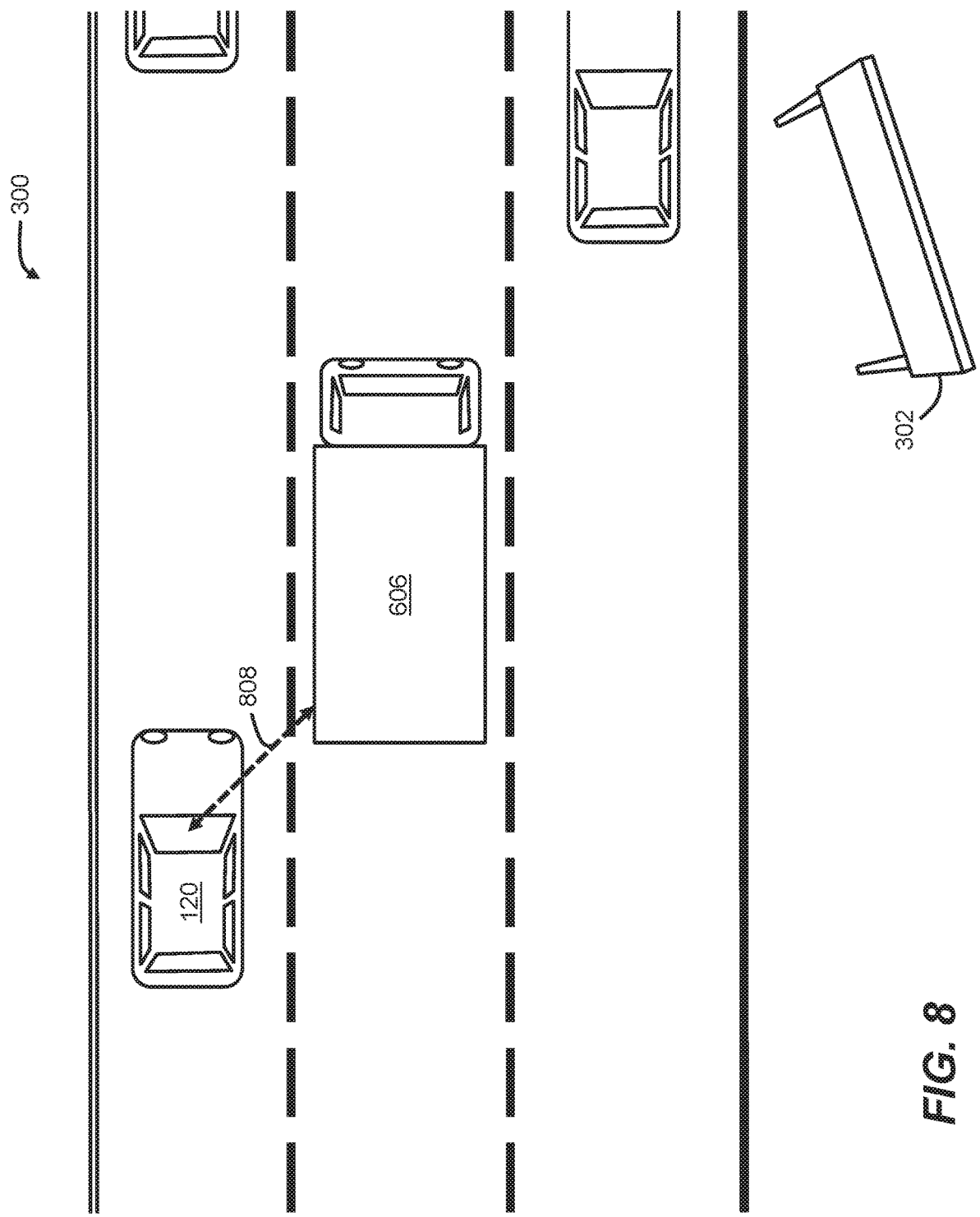

In affecting the view of an autonomous vehicle occupant, embodiments may also include provisions for moving an autonomous vehicle away from content to reduce the chances that the occupant will view the content. For example, a competitor of the sponsor of advertising content may want an occupant not to see the sponsor's advertisement, and may arrange to pay autonomous vehicle service provider 110 for each missed impression. FIGS. 6-8 illustrate an implementation of this embodiment. Referring to FIG. 6, an autonomous vehicle 120 may be traveling along a right lane of a three lane highway 300, with other vehicles surrounding autonomous vehicle 120. At this point, the navigation route may have already been determined according to step 202 of FIG. 2, and the autonomous vehicle 120 may be following that navigation route.

Using location determining devices, such as GPS devices, the autonomous vehicle 120 may then determine that it is approaching content 302 associated with the navigation route. Corresponding to step 204 of FIG. 2, the associated content may be determined dynamically as the autonomous vehicle 120 is traveling or may be predetermined along with the navigation route. Content 302 may be an advertisement by a first sponsor. Autonomous vehicle 120 may further determine that a second sponsor wants an occupant of the vehicle 120 not to see the advertising content 302 of the first sponsor. That determination may be based on information from the content database 118 and profile database 119 of autonomous vehicle service provider 110, instructions received from autonomous vehicle service provider 110, and/or occupant information gathered by the autonomous vehicle 120, as described above.

As with the previous embodiments described above, as the autonomous vehicle 120 is traveling along the navigation route on highway 300, the autonomous vehicle 120 may be monitoring the current conditions of the autonomous vehicle 120 and the occupant of the vehicle 120, corresponding to step 206 of FIG. 2.

In this example, the electronic control unit 122 of the autonomous vehicle 120 may determine whether the occupant is preoccupied or is available to view the content 302 approaching along the navigation route. If the occupant is preoccupied, the electronic control unit 122 may record the event as a missed impression and not change the vehicle position. Electronic control unit 122 may also report the event to autonomous vehicle service provider 110 for accounting and payment purposes with the second sponsor (which may be administered using the content database 118 and profile database 119). However, if the occupant is available to view the content 302, then the electronic control unit 122 may continue according to steps 206 and 208 of FIG. 2, and decide whether the position of autonomous vehicle 120 may be changed based on the current conditions of the vehicle 120.

Accordingly, referring to FIG. 3, the electronic control unit 122 may determine that if autonomous vehicle 120 continues to travel in the right lane, the occupant will have a clear view of the content 302. The electronic control unit 122 may also determine that a second vehicle 606 is traveling in an adjacent center lane, and that the second vehicle 606 is large (e.g., a box truck). The electronic control unit 122 may also determine whether changing the location or heading of the autonomous vehicle 120 may be accomplished, given the present circumstances, for example, the road conditions (e.g., dry, wet, icy, or snow-covered), the road structure (e.g., whether the lanes continue or merge), the traffic conditions (e.g., light or heavy traffic), the spacing and relative speeds, positions, and headings of surrounding vehicles, and the effect on the time and distance of the navigation route (e.g., minimal time and/or distance increase).

In this example, based on the current conditions, the electronic control unit 122 may determine that the autonomous vehicle 120 can be moved to affect the view of the occupant (corresponding to "YES" at step 208 of FIG. 2). Accordingly, electronic control unit 122 may change the movement of the autonomous vehicle 120 along the navigation route by changing, for example, the speed, heading, direction, or lane of the vehicle 120. As shown incrementally in FIGS. 7 and 8, in this example, electronic control unit 122 may slow the speed of the autonomous vehicle 120 relative to the large vehicle 606 in the center lane, and then cause the autonomous vehicle 120 to switch lanes from the right lane to the center lane, and behind the large vehicle 606, and then to switch lanes again from the center lane to the left lane. As represented by the arrow 808 in FIG. 8, this movement may then provide the occupant of the autonomous vehicle 120 with an obstructed view of the content 302 as the autonomous vehicle passes the content 302 on the highway 300.

In embodiments, after affecting the view of the occupant, the system 100 may record the event as a compensable missed impression, for which the second sponsor pays the autonomous vehicle service provider 110. For example, the event may be recorded in the profile database 119 and may be associated with the content 302 and the second sponsor. The event may be based on the change in position of the autonomous vehicle 120, obstructing the content 302. In embodiments, the event may be based on confirmation of the missed impression by tracking the occupant's perception, for example, using occupant sensors 128 such as cameras or eye gaze devices. With the event recorded, the system 100 may facilitate accounting and/or payment for the event (e.g., a few cents for each missed advertising impression) between the autonomous vehicle service provider 110 and the second sponsor.

In embodiments, as the autonomous vehicle 120 is approaching content 302 in FIGS. 6-8, system 100 may include provisions for diverting the occupant's attention away from the content 302. For example, audio/visual interface devices 126 may provide auditory and visual cues, such as tones, blinking lights, or pop-up windows on graphical user interfaces, to cause an occupant to look away from the upcoming content 302. In one implementation, the autonomous vehicle 120 may be equipped with lights adjacent to each window of the vehicle 120, and may illuminate only the lights associated with a particular window to signal to the occupant through which window to look, which is in a direction away from the content 302. In another implementation, the audio/visual interface devices 126 or the occupant's personal mobile communicating device may be used to divert the occupant's attention, for example, with sounds, lights, pop-up windows, or interactive applications (e.g., games).

Embodiments may also include provisions for controlling multiple autonomous vehicles to affect the views seen by occupants of the vehicles. The movements of the multiple autonomous vehicles may be coordinated to provide a desired view for one or more of the vehicles. For example, a first autonomous vehicle according to the present embodiments may be moved to provide a better view of content for a second autonomous vehicle according to the present embodiments. The multiple autonomous vehicles may communicate directly with each other (e.g., with V2V communication) to coordinate movements.

Figure 9:
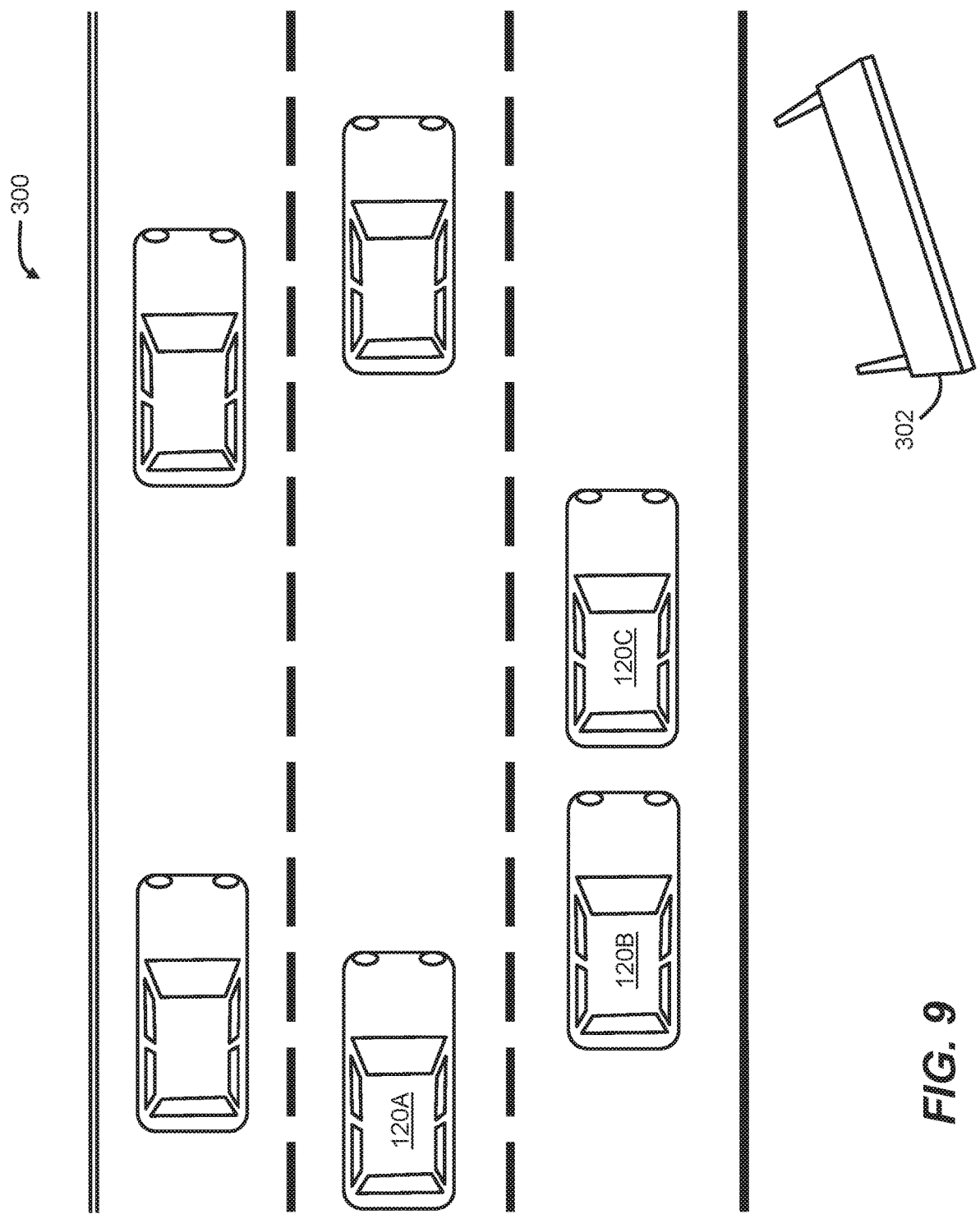
FIGS. 9-11 are schematic diagrams of a method and system for controlling multiple autonomous vehicles to affect the views seen by occupants of the autonomous vehicles, according to an embodiment.
Figure 10:
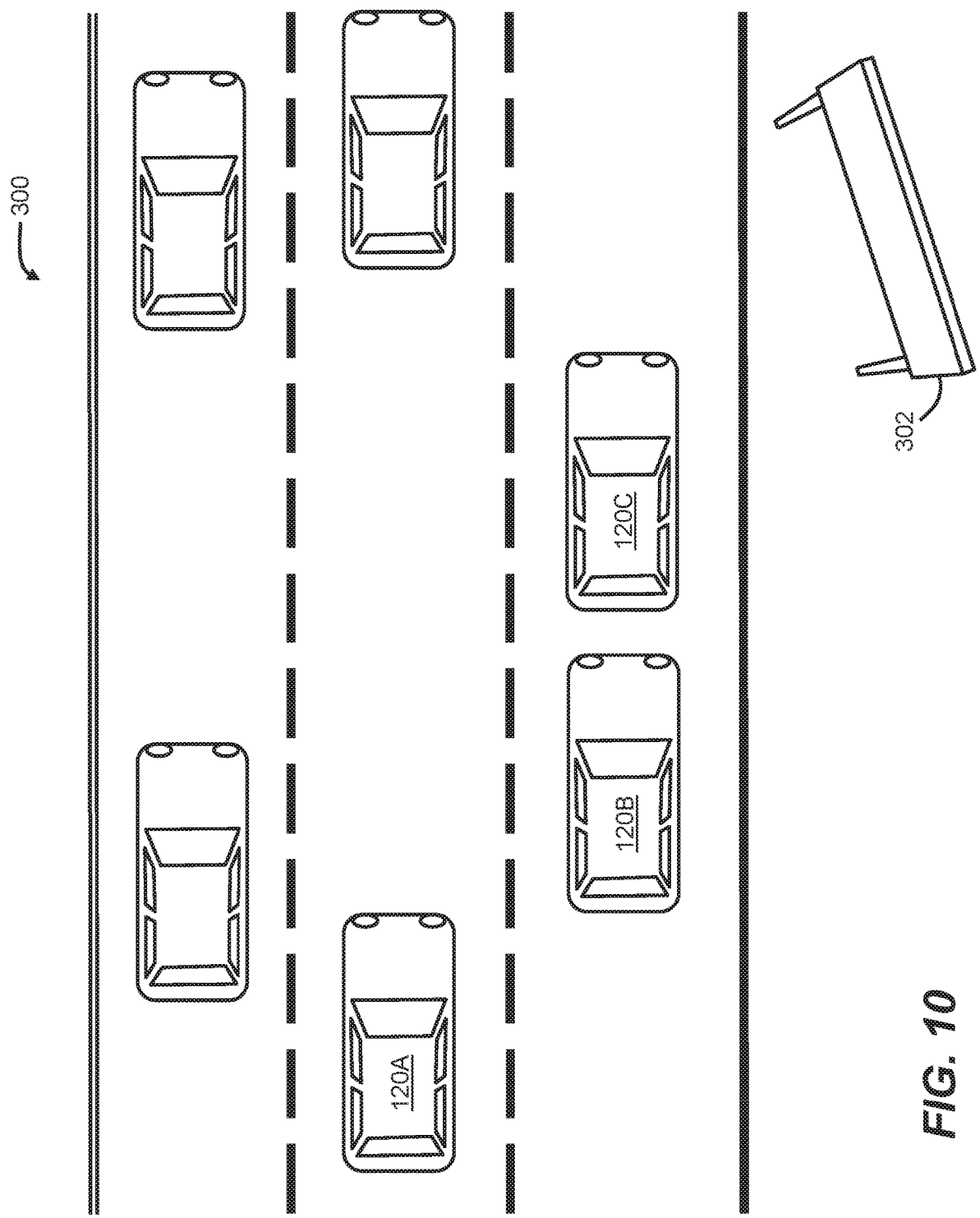
Figure 11:
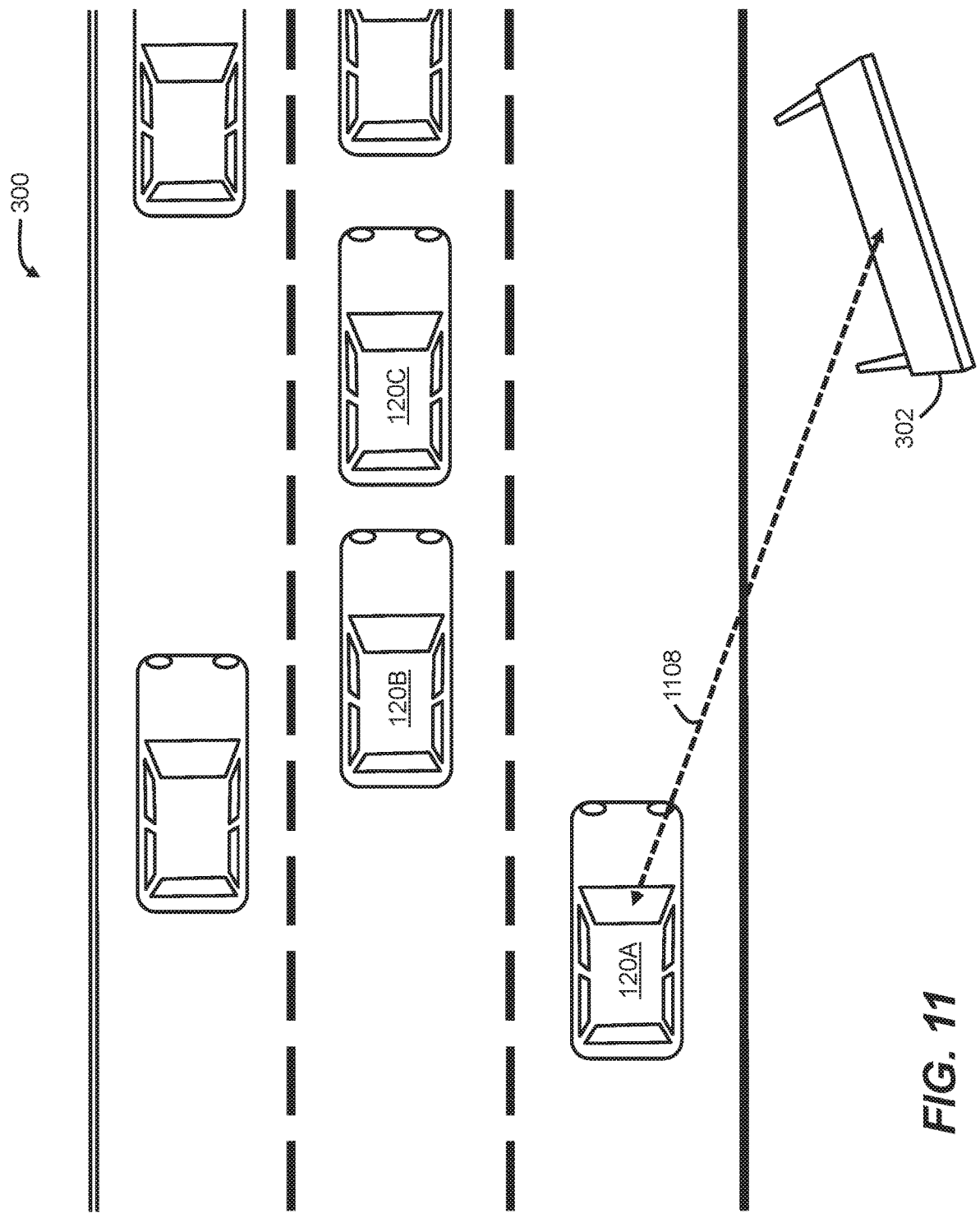

FIGS. 9-11 illustrate an example of this coordinated control of multiple autonomous vehicles. As shown in FIG. 9, in this example, an autonomous vehicle 120A may be traveling in the center lane of a three lane highway 300, with vehicles surrounding autonomous vehicle 120A, including autonomous vehicles 120B and 120C in the right lane adjacent to the center lane. For brevity, all three autonomous vehicles 120A, 120B, and 120C may be considered to be provisioned and configured as described above in previous embodiments, as part of system 100 of FIG. 1. In this example, each of vehicles 120A, 120B, and 120C may assess whether the content 302 is appropriate for the occupant of the particular vehicle. For purposes of this illustration, the content may be considered appropriate for autonomous vehicle 120A, but not for the occupants of autonomous vehicles 120B and 120C. In some cases, autonomous vehicles 120B and 120C may not even have occupants, for example, if those vehicles are traveling to pick up occupants.

After determining that the content 302 is appropriate for the occupant of autonomous vehicle 120A, and that the position of vehicle 120A may be changed to improve the occupant's view, the vehicles 120A, 120B, and 120C may be controlled to coordinate movement of vehicle 120A closer to the content 302 and to move vehicles 120B and 120C out of the way of vehicle 120A and farther from the content 302, using the same techniques and devices described in the previous embodiments. FIGS. 9-11 incrementally illustrate this controlled, synchronized movement. As shown between FIGS. 9 and 10, the speed of vehicle 120A is decreased, while the speeds of vehicles 120B and 120C are increased, to create space in the right lane for vehicle 120A. Then, as shown between FIGS. 10 and 11, vehicles 120B and 120C switch lanes from the right lane to the center lane, while vehicle 120A switches lanes from the center lane to the right lane, thereby providing the occupant of vehicle 120A with a clear view of the content 302 as represented by the arrow 1108 in FIG. 11.

Although embodiments presented herein are in the context of advertising, the present embodiments are applicable to many other types of content. For example, the present embodiments may be used to provide sightseeing tours in autonomous vehicles, positioning the vehicles for better views of scenic viewpoints, landscape lookouts, buildings, and other points of interest.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method for controlling an autonomous vehicle to affect a view seen by an occupant of the autonomous vehicle, the method comprising:
   determining a navigation route;
   determining content associated with the navigation route;
   monitoring current conditions of the autonomous vehicle and the occupant, wherein the current conditions of the occupant comprise a current activity of the occupant;
   determining, based on the current conditions, whether to change a position of the autonomous vehicle to affect the view seen by the occupant; and
   when the current conditions permit, moving the autonomous vehicle to affect the view seen by the occupant.

2. The method of claim 1, wherein determining content associated with the navigation route comprises determining content that is viewable by occupants of vehicles traveling along the navigation route.

3. The method of claim 1, wherein the current conditions of the autonomous vehicle comprise at least one of speed, direction, heading, lane position, position relative to other vehicles, or size.

4. The method of claim 1, wherein the current conditions of the autonomous vehicle comprise information about vehicles surrounding the autonomous vehicle, the information including at least one of speed, direction, heading, lane position, position relative to other vehicles, or size.

5. The method of claim 1, wherein the current conditions of the autonomous vehicle comprise whether changing the position of the autonomous vehicle will undesirably impact at least one of speed of the autonomous vehicle, route travel time, and/or route distance.

6. The method of claim 1, wherein the current conditions of the autonomous vehicle comprise whether an autonomous vehicle service provider associated with the autonomous vehicle will receive from a content provider associated with a particular content, compensation for a view of the particular content by the occupant, and
   wherein determining, based on the current conditions, whether to change a position of the autonomous vehicle to affect the view seen by the occupant occurs while the autonomous vehicle is traveling along the navigation route.

7. The method of claim 1, wherein monitoring the current activity of the occupant comprises receiving information from at least one of a camera, a microphone, an eye gaze detection device, a pressure sensor, a heat sensor, a wireless communication sensor, an accelerometer, a gyroscope, a physiological sensor, a temperature sensor, a biometric sensor, or an occupant's mobile computing/communication device.

8. The method of claim 1, wherein determining whether to change the position of the autonomous vehicle to affect the view seen by the occupant considers whether the occupant is currently available to view a particular content as the autonomous vehicle passes the particular content along the navigation route.

9. The method of claim 1, wherein moving the autonomous vehicle comprises moving the autonomous vehicle from a first lane of a road to a second lane of the road that is closer to a particular content than the first lane.

10. The method of claim 1, wherein moving the autonomous vehicle comprises moving the autonomous vehicle to a position at which another vehicle obstructs a view by the occupant of a particular content as the autonomous vehicle passes the particular content.

11. The method of claim 1, wherein in moving the autonomous vehicle to affect the view seen by the occupant, the method further comprises recording, as a compensable event for which an autonomous vehicle service provider associated with the autonomous vehicle is paid, a movement of the autonomous vehicle from a first lane of a road to a second lane of the road that provides the occupant with a view of a particular content as the autonomous vehicle passes the particular content along the navigation route.

12. The method of claim 1, further comprising activating, as the autonomous vehicle passes a particular content along the navigation route, an audio and/or visual device in the autonomous vehicle that diverts the occupant's attention away from a direction in which the particular content is viewable by the occupant.

13. The method of claim 1, further comprising changing a position of a second autonomous vehicle adjacent to the autonomous vehicle, to allow the autonomous vehicle to be moved to affect the view seen by the occupant.

14. A method for controlling an autonomous vehicle to affect a view seen by an occupant of the autonomous vehicle, the method comprising:
  determining a navigation route;
  determining content associated with the navigation route;
  monitoring current conditions of the autonomous vehicle and the occupant;
  determining, based on the current conditions, without user input, and while the autonomous vehicle is traveling along the navigation route, whether to change a position of the autonomous vehicle to affect the view seen by the occupant; and
  when the current conditions permit, moving the autonomous vehicle to affect the view seen by the occupant.

15. A method for controlling multiple autonomous vehicles to affect a view seen by an occupant of a first autonomous vehicle, the method comprising:
  determining a navigation route of the first autonomous vehicle;
  determining content associated with the navigation route;
  monitoring current conditions of the first autonomous vehicle,
  wherein the current conditions include information about a second autonomous vehicle impacting the view seen by the occupant of the first autonomous vehicle;
  determining, based on the current conditions, without user input, and while the first autonomous vehicle is traveling along the navigation route and approaching content, whether to change a position of at least one of the first autonomous vehicle or the second autonomous vehicle to affect the view seen by the occupant of the first autonomous vehicle; and
  when the current conditions permit, moving at least one of the first autonomous vehicle or the second autonomous vehicle to affect the view seen by the occupant of the first autonomous vehicle.

16. The method of claim 15, further comprising:
  monitoring whether the occupant of the first autonomous vehicle is available to view the content; and
  when the occupant of the first autonomous vehicle is available and the current conditions permit, moving at least one of the first autonomous vehicle or the second autonomous vehicle to affect the view seen by the occupant of the first autonomous vehicle.

17. The method of claim 15, further comprising determining that the content is more appropriate for the occupant of the first autonomous vehicle than an occupant of the second autonomous vehicle.

18. A system for autonomous vehicle control to affect occupant view, the system comprising:
  an autonomous vehicle including:
    an electronic control unit,
    a wireless communication device in communication with an autonomous vehicle service provider through a wireless network, and
    a vehicle sensor;
  wherein the electronic control unit controls travel of the autonomous vehicle along a navigation route,
  wherein the electronic control unit receives from the autonomous vehicle service provider information associating content with the navigation route,
  wherein the electronic control unit receives from the vehicle sensor information concerning current conditions of the autonomous vehicle as the autonomous vehicle travels on the navigation route,
  wherein the electronic control unit receives information concerning current conditions of an occupant of the autonomous vehicle as the autonomous vehicle travels on the navigation route, wherein the current conditions of the occupant comprise a current activity of the occupant,
  wherein, based on the current conditions of the autonomous vehicle and the current conditions of the occupant, the electronic control unit determines whether to change a position of the autonomous vehicle to affect a view seen by an occupant of the autonomous vehicle, and
  wherein, when the current conditions of the autonomous vehicle and the current conditions of the occupant permit, the electronic control unit moves the autonomous vehicle to affect the view seen by the occupant.

19. The system of claim 18, further comprising an occupant sensor configured to detect the current activity of the occupant,
  wherein the electronic control unit receives from the occupant sensor information concerning whether the occupant is available to view the content, and
  wherein, when the occupant is available and the current conditions of the autonomous vehicle permit, the electronic control unit moves the autonomous vehicle to affect the view seen by the occupant.

20. A system for autonomous vehicle control to affect occupant view, the system comprising:
  an autonomous vehicle including:
    an electronic control unit,
    a wireless communication device in communication with an autonomous vehicle service provider through a wireless network, and
    a vehicle sensor;
  wherein the electronic control unit controls travel of the autonomous vehicle along a navigation route,
  wherein the electronic control unit receives from the autonomous vehicle service provider information associating content with the navigation route,
  wherein the electronic control unit receives from the vehicle sensor information concerning current conditions of the autonomous vehicle as the autonomous vehicle travels on the navigation route, wherein, based on the current conditions, the electronic control unit determines whether to change a position of the autonomous vehicle to affect a view seen by an occupant of the autonomous vehicle, wherein, when the current conditions permit, the electronic control unit moves the autonomous vehicle to affect the view seen by the occupant, and wherein the electronic control unit sends to the autonomous vehicle service provider through the wireless network, an event record of the movement of the autonomous vehicle to affect the view seen by the occupant.

* * * * *